US009068366B2

(12) United States Patent
Petzold et al.

(10) Patent No.: US 9,068,366 B2

(45) Date of Patent: Jun. 30, 2015

(54) MOBILE WORK MACHINE HAVING SUPPORT BOOMS

(75) Inventors: Wolf-Michael Petzold, Aichwald (DE); Martin Mayer, Reutlingen (DE); Dirk Hoevemeyer, Dettingen (DE)

(73) Assignee: Putzmeister Engineering GmbH, Aichtal (DE)

( * ) Notice: Subject to any disclaimer, the term of this patent is extended or adjusted under 35 U.S.C. 154(b) by 287 days.

(21) Appl. No.: 12/998,146

(22) PCT Filed: Sep. 21, 2009

(86) PCT No.: PCT/EP2009/062168

§ 371 (c)(1), (2), (4) Date: Mar. 22, 2011

(87) PCT Pub. No.: WO2010/060668

PCT Pub. Date: Jun. 3, 2010

(65) Prior Publication Data

US 2011/0196583 A1 Aug. 11, 2011

(30) Foreign Application Priority Data

Nov. 3, 2008 (DE) ........................ 10 2008 055 625

(51) Int. Cl.

*G06F 19/00* (2011.01)

*E04G 21/04* (2006.01)

(Continued)

(52) U.S. Cl.

CPC ................ *E04G 21/04* (2013.01); *B66C 23/78* (2013.01); *B66C 23/905* (2013.01); *E04G 21/0436* (2013.01)

(58) Field of Classification Search

CPC ...... B66C 13/18; E02F 3/434; E04G 21/0436

USPC ........ 280/763.1, 764.1, 765, 1, 766.1; 701/50

See application file for complete search history.

(56) References Cited

U.S. PATENT DOCUMENTS 5,848,485 A * 12/1998 Anderson et al. ............... 37/348

5,887,735 A 3/1999 Abel (Continued)

FOREIGN PATENT DOCUMENTS

DE 295 19 928 4/1966

DE 100 32 622 1/2002

(Continued)

OTHER PUBLICATIONS

International Search Report, Dec. 4, 2009.

*Primary Examiner* — Redhwan K Mawari

*Assistant Examiner* — Rodney P King

(74) *Attorney, Agent, or Firm* — Collard & Roe, P.C.

(57) ABSTRACT

The invention relates to a mobile work machine having a chassis (10) and with two front and two rear support brackets (20, 22). The support brackets can be displaced from a driving position close to the chassis into a support position by changing the base angles (α) thereof and/or can be telescoped by changing the lengths thereof between the end on the mounting side and that on the free end. In order to be able to automatically determine the support leg positions ($X_c/Y_c$) in relation to the chassis (10), three transceiver units ($S_1/E_1$, $S_2/E_2$, $S_3/E_3$) related to the support legs are provided for transmitting and receiving run time or distance signals. Furthermore, a microprocessor-supported evaluation unit responding to the transmitted and received signals of the transceiver units arranged in pairs is provided, comprising a software routine for determining the support leg positions in a coordinate system (x/y) fixed to the chassis.

7 Claims, 2 Drawing Sheets

Figure 1A:
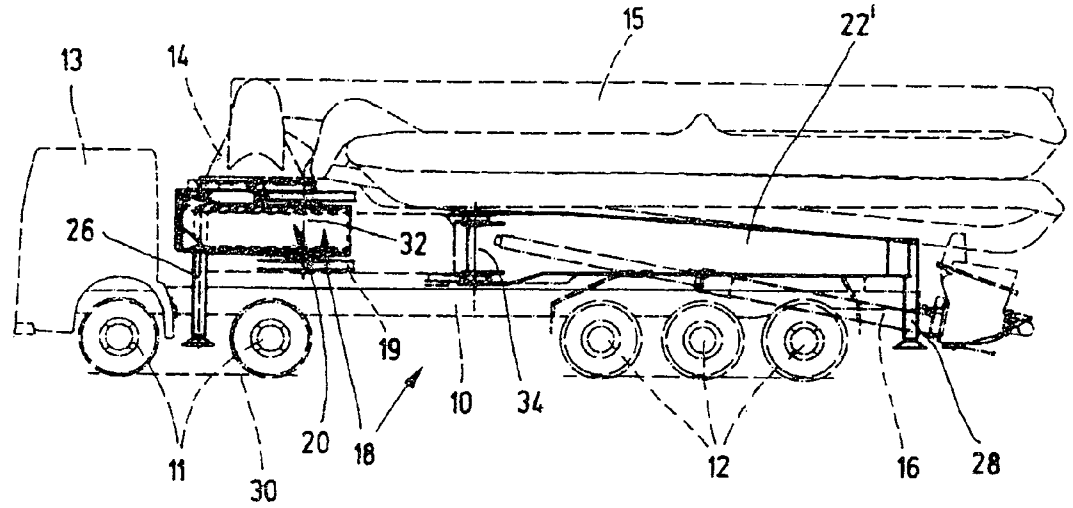

(51) Int. Cl.
*B66C 23/78* (2006.01)
*B66C 23/90* (2006.01)

(56) References Cited

U.S. PATENT DOCUMENTS

| | | | | |
|---|---|---|---|---|
| 6,202,013 | B1 | 3/2001 | Anderson et al. | |
| 6,840,540 | B2 * | 1/2005 | Fugel | 280/763.1 |
| 2002/0021960 | A1 * | 2/2002 | Waggoner | 414/745.4 |
| 2003/0230414 | A1 * | 12/2003 | Peltola et al. | 169/47 |
| 2009/0283163 | A1 | 11/2009 | Wehner et al. | |

FOREIGN PATENT DOCUMENTS

| | | |
|---|---|---|
| DE | 10 2006 031 257 | 1/2008 |
| EP | 1 356 910 | 10/2003 |
| EP | 1 772 415 | 4/2007 |
| EP | 1 925 585 | 5/2008 |

* cited by examiner

MOBILE WORK MACHINE HAVING SUPPORT BOOMS

CROSS REFERENCE TO RELATED APPLICATIONS

This application is the National Stage of PCT/EP2009/062168 filed on Sep. 21, 2008, which claims priority under 35U. S. C. §119 of German Application No. 10 2008 055 625.4 filed on Nov. 3, 2008, the disclosure of which is incorporated by reference. The international application under PCT article 21 (2) was not published in English.

The invention relates to a mobile work machine having a chassis and having two front and two rear support booms, whereby the support booms are mounted, with a bearing-side end, on a swivel joint or slider joint fixed in place on the chassis, carry a telescoping support leg that can be supported on the subsurface at their free end, and can be moved out from a travel position, close to the chassis, into a support position, away from the chassis, by being pivoted, changing the basic angle between support boom and chassis, and/or by being telescoped, changing the length of its support boom between the bearing-side end and the free end.

Mobile work machines of this type are mobile concrete pumps, for example, which have a concrete distributor that serves as a carrier for a feed line, which distributor is articulated, with its first mast arm, onto a rotating head that can be rotated about a vertical axis of the chassis, by means of controlling a rotary drive, and the mast arms of which distributor can be pivoted about horizontal bending axes, relative to the rotating head and relative to an adjacent mast arm, in each instance, by means of controlling related bending drives. Mobile cranes or mobile extension ladders are other possible applications.

The support booms, which are supported on the subsurface with their support legs, delimit a support rectangle, when the chassis is raised, that has four tipping edges that extend between the adjacent corners, beyond which the center of gravity of the system is not allowed to go, toward the outside. In the case of a mobile concrete pump, usually a rotation of the fully extended and supported concrete distributor mast by 360° of its rotating head is possible when the support booms are fully extended and supported, without any risk of tipping. Furthermore, it is also known, primarily in the case of narrow construction sites, that the support booms are extended and supported only on one side of the chassis, while they are supported on the subsurface in their pivoted-in position on the other side. In this case, a restricted work range of the concrete distributor mast occurs, toward the side supported by the extended support booms.

Furthermore, it is known from DE-10 2006 031 257 A1, in the case of a mobile concrete pump, that each support boom has a support position close to the chassis and at least one support position away from the chassis, which positions can be freely selected for the four support booms, forming defined support configurations. In the case of each support configuration, only those mast movements with which the center of gravity of the machine moves within the support rectangle, in other words within the tipping edges, without the risk of incorrect operation, are allowed. In the case of variable support leg extensions, it is important to know the support leg positions. Only in this way can a prediction be made concerning the stability of the support. In the case of the known support devices, the support legs can only be positioned in specific, discrete positions, for safety reasons. These positions are selected by the mobile concrete pump driver, depending on the space conditions at the work site. It is felt to be disadvantageous, in this connection, that intermediate positions of the support device, which would be possible at the work site in terms of space, are not allowed.

Proceeding from this, the invention is based on the task of improving the known work machine of the type indicated initially, to the effect that automatic detection of the support leg positions and thus of the permissible load moments is possible, so that during set-up, greater variability in the positioning of the support legs exists, without any loss in stability.

In order to accomplish this task, the characteristics indicated in claim 1 are proposed. Advantageous embodiments and further developments of the invention are evident from the dependent claims.

The solution according to the invention primarily proceeds from the idea that automatic determination of the support leg positions is possible in terms of measurement technology, so that the support rectangle beyond the side edges of which the center of gravity of the system is not allowed to go during movement of a work boom can be determined for every support configuration. In order to achieve this, it is proposed, according to the invention, that three support-boom-related transmission and reception units, in each instance, are provided for transmitting and receiving running time signals or distance signals, with a first transmission and reception unit being disposed at a reference point on the bearing side, fixed in place on the chassis, in the immediate vicinity of the swivel joint or slider joint fixed in place on the chassis, a second transmission and reception unit being disposed at a reference point fixed in place on the chassis, disposed at a defined distance from the bearing-side reference point, and a third transmission and reception unit being disposed at a reference point in the vicinity of the free support boom end, fixed in place on the boom, in such a manner, in each instance, that their transmission signals can be alternately transmitted to the adjacent receivers, in a straight line, and whereby a microprocessor-supported evaluation unit that responds to the transmission and reception signals of the transmission and reception units, which are assigned to one another in pairs, is provided, which unit has a software routine for determining the boom-fixed reference point or the support leg position in a chassis-fixed coordinate system. The three reference points according to the invention span a triangle that can be measured by way of the transmission and reception units disposed there, in the manner of a triangulation method, determining the support leg positions selected in a specific set-up. The triangle corners defined by the reference points must lie freely opposite one another, so that interference-free measurement is possible.

A preferred embodiment of the invention provides that the transmission and reception units have an ultrasound transmitter and an ultrasound receiver, in each instance, which form a distance measurement system that can be used in pairs, between the reference points, in both directions, and is therefore redundant. In this connection, the distance is measured by means of a running time measurement, in each instance. The known distance between the first and the second chassis-fixed reference point can be used as a reference for determining the two variable distances from the boom-fixed reference point. In this way, temperature compensation, which takes the temperature-dependence of the speed of sound into account, is possible at the same time. An interference-free measurement is made possible in that the transmission and reception units overlap in their range of effect. In order to be able to correctly assign the transmission and reception signals of the three different transmission and reception units of each support boom to one another, it is advantageous if the transmission signals have a coding that can be identified at the receivers, in each instance.

Fundamentally, it is possible to also equip the transmission and reception units with light transmitters or light receivers, whereby the light transmitters can be configured as lasers. The use of radio transmitters and radio receivers in the transmission and reception units is also possible.

A particularly advantageous use of the invention is possible in mobile concrete pumps. For this purpose, it is advantageous if the mobile work machine has a bending mast that serves as a carrier for a feed line, is disposed on a substructure fixed in place on the chassis, and has at least three mast arms, the first mast arm of which is articulated, with a free end, onto a rotating head that can be rotated about a vertical axis of the chassis, by means of controlling a rotary drive, and whereby the mast arms can be pivoted about horizontal bending axes, relative to the rotating head and/or relative to an adjacent mast arm, in each instance, by means of controlling related bending drives.

Figure 1B:
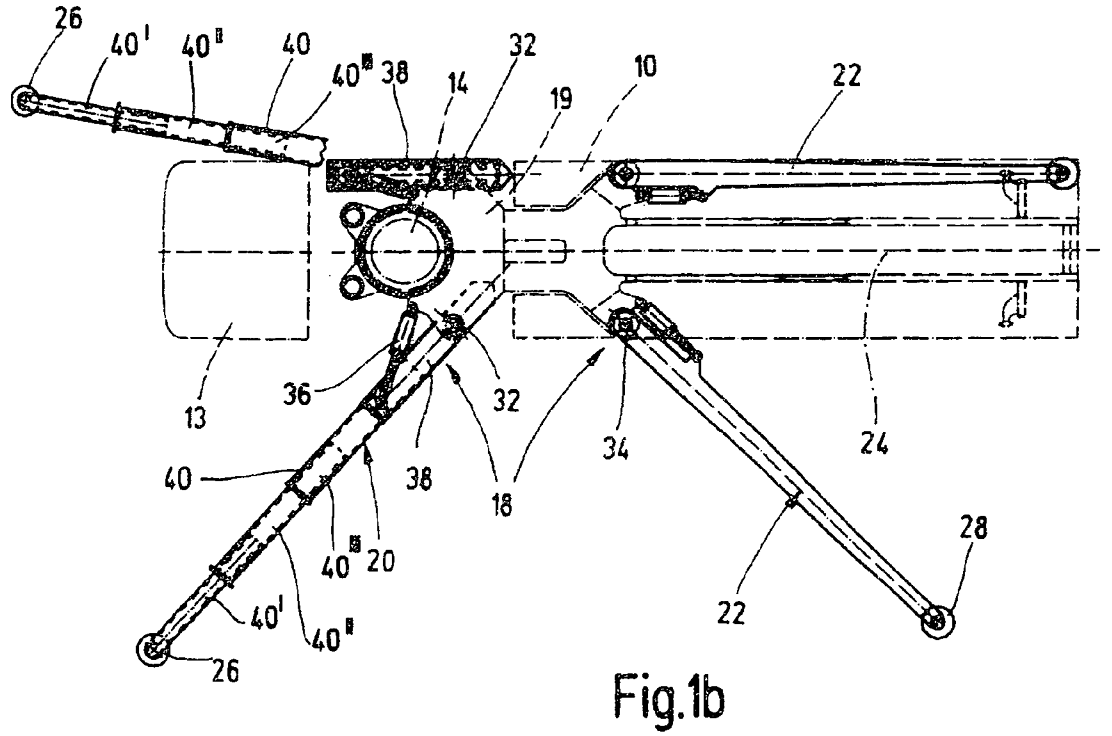
Figure 2:
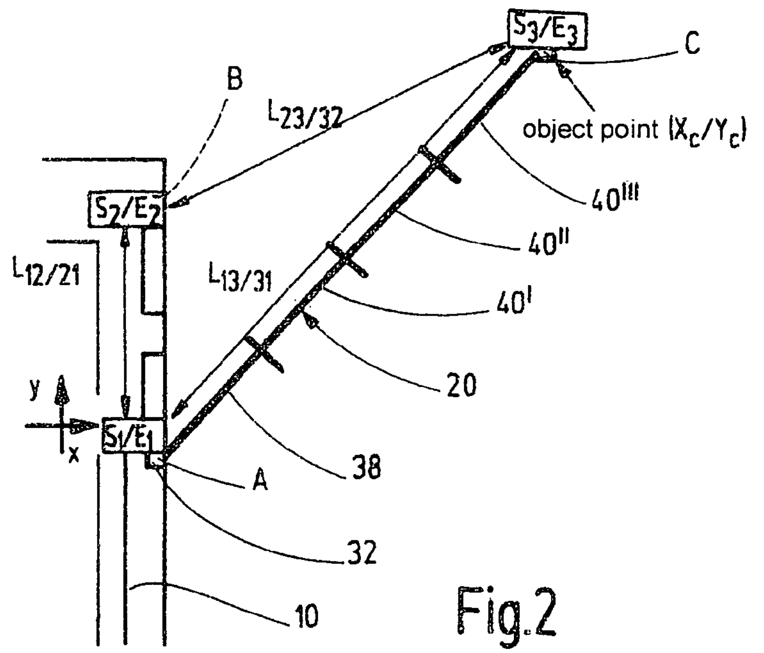
Figure 3:
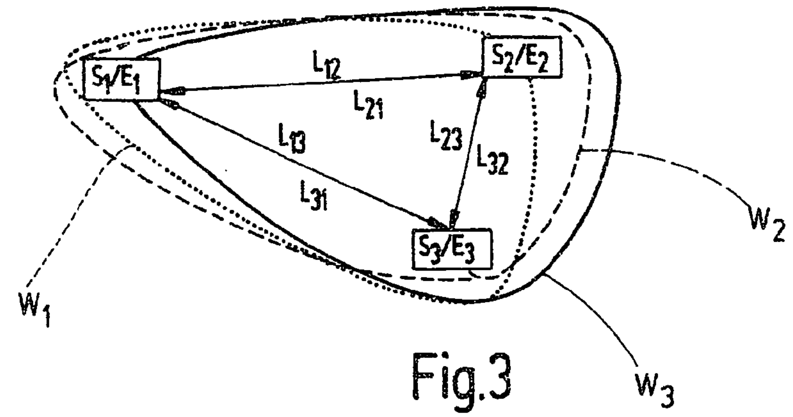
Figure 4:
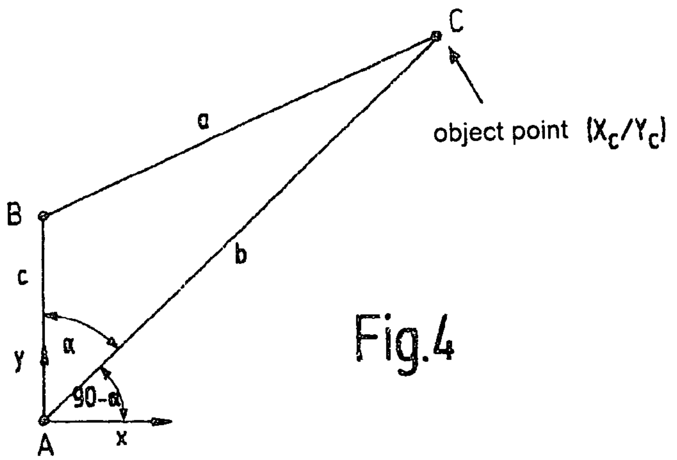

In the following, the invention will be explained in greater detail using an exemplary embodiment shown schematically in the drawing. This shows:

FIG. 1*a* a side view of a mobile concrete pump with support booms in the travel position;

FIG. 1*b* a top view of the mobile concrete pump according to FIG. 1, with support booms in various support positions;

FIG. 2 a schematic of a front support boom with position measurement system;

FIG. 3 schematic of the range of effect of the transmission/reception units;

FIG. 4 a geometrical representation of the exemplary embodiment according to FIG. 2 for determining the support leg position (object) by means of triangulation.

The mobile concrete pump shown in FIGS. 1*a* and *b* essentially consists of a multi-axle chassis 10 having two front axles 11 and three rear axles 12, having a driver's cab 13, a concrete distributor mast 15 mounted on a rotary mechanism 14, close to the front axle, to rotate about a vertical axle, having a pump arrangement 16 mounted on the chassis 10 at a distance from the rotary mechanism 14, as well as having a support construction 18 for the chassis 10. The support construction 18 has a support frame 19 fixed in place on the chassis, and comprises two front support booms 20 and two rear support booms 22, which are retracted and oriented parallel to the longitudinal vehicle axis 24 in the transport position, and project beyond the chassis 10 in the support position, at a slant toward the front or toward the rear, respectively.

The front support booms 20 can be pivoted about their vertical pivot axles 32, and the rear support booms 22 can be pivoted about their vertical pivot axles 34, between a travel position and a support position, under the effect of an extension cylinder 36, in each instance. Furthermore, all the support booms 20, 22 have a telescoping support leg 26, 28 at their free end, with which they can be supported on a subsurface 30, raising the chassis 10.

The front support booms 20 are configured as telescope booms. They comprise, in each instance, an extension box 38 that can be pivoted relative to the chassis about the vertical pivot axle 32, and a telescope part 40 that consists of three telescope segments 40', 40'', 40'''. A hydrocylinder that can telescope multiple times, and is not shown in the drawing, extends through the extension box 38 and the telescope part 40. As can be seen in FIG. 1*b*, the support booms can optionally be supported on the subsurface with their support legs, depending on the space requirements at the construction site, with the formation of different extension configurations, in an inner support position, a support position close to the chassis, or an outer support position, away from the chassis. A particular feature of the present invention consists in that all the intermediate positions between the inner and the outer support position are also possible. The latter is made possible in that a measurement arrangement is provided, with which the position of the support leg 26 in a chassis-fixed coordinate system can be automatically determined.

The measurement system has three transmission and reception units $S_1/E_1$, $S_2/E_2$, and $S_3/E_3$, in each instance, on each support boom, which units are designed for transmitting and receiving running time signals or distance signals. Preferably, ultrasound transmitters and receivers are used for this purpose. Fundamentally, however, it is also possible to use light or radio transmitters and receivers. In this connection, a first transmission and reception unit $S_1/E_1$ is disposed fixed in place on the chassis, at a bearing-side reference point A, in the immediate vicinity of the chassis-fixed swivel joint 32. A second transmission and reception unit $S_2/E_2$ is disposed at the chassis-fixed reference point B, situated at a defined distance $L_{12/21}$ from the bearing-side reference point A, while a third transmission and reception unit $S_3/E_3$ is disposed at a boom-fixed reference point C, in the vicinity of the free end of the support boom 40. The reference points A, B, and C, at which the transmission and reception units are situated, are disposed, according to FIG. 3, in such a manner that their ranges of effect $W_1$, $W_2$, $W_3$ overlap, so that their transmission signals can be reciprocally transmitted to the receivers of the other reference points, in echo-free manner, in a straight line.

According to FIGS. 2, 3, and 4, the reference points A, B, and C span a triangle whose side lengths can be measured using the transmission and reception units, by means of transmitting and receiving ultrasound signals in both directions. The length values are referred to as $L_{12}$ and $L_{21}$, $L_{23}$ and $L_{32}$, as well as $L_{13}$ and $L_{31}$, depending on the direction of their measurement. The measurement is carried out in both directions, in order to obtain redundancy and thus greater reliability of the measurement results. The goal of the measurement arrangements in the different support legs is to determine the support leg position and thus the object point $X_c/Y_c$ in the chassis-fixed coordinate system x/y. Taking the geometrical arrangement in FIG. 4 into consideration, the coordinates $X_c$ and $Y_c$ at the object point C are calculated as follows:

The lengths of the triangle sides a, b, and c are known from the path measurements according to FIG. 2. The coordinates $X_c/Y_c$ in the x/y coordinate system are being sought.

According to the law of cosines, it holds true that $$\cos\alpha = \frac{(b^2 + c^2 - a^2)}{2 \cdot b \cdot c} \tag{1}$$

$$\alpha = \arccos\frac{(b^2 + c^2 - a^2)}{2 \cdot b \cdot c}$$

From this, the coordinates of the object point can be calculated as follows:

$$X_c = \cos(90° - \alpha) \cdot b \tag{2}$$

$$Y_c = \sin(90° - \alpha) \cdot b \tag{3}$$

The length measurement values of the triangle sides are scaled for the further calculation. In the signal scaling, the redundancy in the length measurement in the two directions is also taken into consideration and evaluated. In this connection, the vehicle-fixed distance $L_{12}/L_{21}$ is used as a reference distance for temperature compensation and for determining correction factors for the two other length measurements. The calculation of the support leg position then takes place using the above equations.

In summary, the following should be stated: The invention relates to a mobile work machine having a chassis 10 and having two front and two rear support booms 20, 22. The support booms can be moved out from a travel position, close to the chassis, into a support position, away from the chassis, by being pivoted, changing their basic angle $\alpha$ between support boom and chassis, and/or by being telescoped, changing their length between the bearing-side end and the free end. In order to allow automatic determination of the support leg position $X_c/Y_c$ with reference to the chassis 10, three support-boom-related transmission and reception units $S_1/E_1$ to $S_3/E_3$ are provided, in each instance, for transmission and reception of running time signals or distance signals. Furthermore, a microprocessor-supported evaluation unit that responds to the transmission and reception signals of the transmission and reception units, which are assigned to one another in pairs, is provided, which unit has a software routine for determining the support leg position in a chassis-fixed coordinate system x/y.

The invention claimed is:

1. Mobile work machine having a chassis and having support booms, whereby the support booms are mounted, with a bearing-side end, on a swivel joint or slider joint fixed in place on the chassis, carry a telescoping support leg that can be supported on the subsurface at their free end, and can be moved out from a travel position, close to the chassis, into a support position, away from the chassis, by being pivoted, changing the basic angle between support boom and chassis, and/or by being telescoped, changing the length of their support boom between the bearing-side end and their free end, comprising three support-boom-related transmission and reception units, in each instance, for transmission and reception of running time signals or distance signals, with a first transmission and reception unit being disposed at a reference point on the bearing side, fixed in place on the chassis, in the immediate vicinity of the swivel joint or slider joint fixed in place on the chassis, a second transmission and reception unit being disposed at a reference point fixed in place on the chassis, disposed at a defined distance from the bearing-side reference point, and a third transmission and reception unit being disposed at a reference point in the vicinity of the free support boom end, fixed in place on the boom, in such a manner, in each instance, that their transmission signals can be alternately transmitted to the receiver of an adjacent transmission and reception unit, and whereby a microprocessor-supported evaluation unit that responds to the transmission and reception signals of the transmission and reception units, which are assigned to one another in pairs, is provided, which unit has a software routine for determining the coordinates of the boom-fixed reference point or the position of the support leg in a chassis-fixed coordinate system, and wherein the defined distance between the first bearing-side, chassis-fixed reference point and the second chassis-fixed reference point forms a reference distance for the other reception measurements.

2. Mobile work machine according to claim 1, wherein the transmission and reception units have an ultrasound transmitter and an ultrasound receiver.

3. Mobile work machine according to claim 1, wherein the transmission and reception units have a light transmitter and a light receiver.

4. Mobile work machine according to claim 3, wherein the light transmitter has a laser.

5. Mobile work machine according to claim 1, wherein the transmission and reception units that are adjacent to one another have overlapping ranges of effect.

6. Mobile work machine according to claim 1, wherein the transmission signals of the transmission and reception units have a coding that can be identified by the receivers of the transmission and reception units.

7. Mobile work machine according to claim 1, further comprising a bending mast that serves as a carrier for a feed line, disposed on a substructure fixed in place on the chassis, and has at least three mast arms, which is articulated, with its one end, onto a rotating head that can be rotated about a vertical axis of the chassis.

* * * * *